United States Patent [19]

Berglund

[11] Patent Number: 4,560,540
[45] Date of Patent: Dec. 24, 1985

[54] METHOD FOR RECOVERING USEFUL PRODUCTS FROM WASTE PRODUCTS OBTAINED WHEN MANUFACTURING ALUMINIUM FLUORIDE

[75] Inventor: Lennart H. A. Berglund, Helsingborg, Sweden

[73] Assignee: Boliden Aktiebolag, Stockholm, Sweden

[21] Appl. No.: 534,464

[22] PCT Filed: Dec. 21, 1982

[86] PCT No.: PCT/SE82/00434
§ 371 Date: Aug. 31, 1983
§ 102(e) Date: Aug. 31, 1983

[87] PCT Pub. No.: WO83/02444
PCT Pub. Date: Jul. 21, 1983

[30] Foreign Application Priority Data
Jan. 7, 1982 [SE] Sweden ................ 820045

[51] Int. Cl.$^4$ .................. C01F 1/00; C01F 7/54
[52] U.S. Cl. .................. 423/116; 423/111; 423/126
[58] Field of Search .................. 423/111, 116, 126

[56] References Cited

U.S. PATENT DOCUMENTS

| | | | |
|---|---|---|---|
| 2,573,282 | 10/1951 | Sciacca et al. | 423/116 |
| 2,783,128 | 2/1957 | Wendt | 423/116 |
| 2,916,352 | 12/1959 | Fitch et al. | 423/126 X |
| 3,175,882 | 3/1965 | Derr | 423/116 |
| 3,493,330 | 2/1970 | Vancil et al. | 423/116 X |
| 3,755,532 | 8/1973 | Harrison et al. | 423/116 |

FOREIGN PATENT DOCUMENTS 49417  5/1965  Poland .................. 423/116

Primary Examiner—Donald R. Valentine
Attorney, Agent, or Firm—Brumbaugh, Graves, Donohue & Raymond

[57] ABSTRACT

The invention relates to a method for recovering useable products from waste products deriving from the manufacture of aluminium fluoride on the basis of aluminium hydroxide and fluosilicic acid. Mother liquors and washing water from a scrubber in said process, which solutions contain aluminium, silica, fluorine, and phosphorous is reacted in a first step with sodium ions at pH 2-3, and a temperature of 50°-100° C. to give a precipitate of sodium fluoroaluminate, which is isolated. The filtrate from said first step can be reacted with the silica waste product obtained in the above mentioned aluminium fluoride manufacture.

11 Claims, 1 Drawing Figure

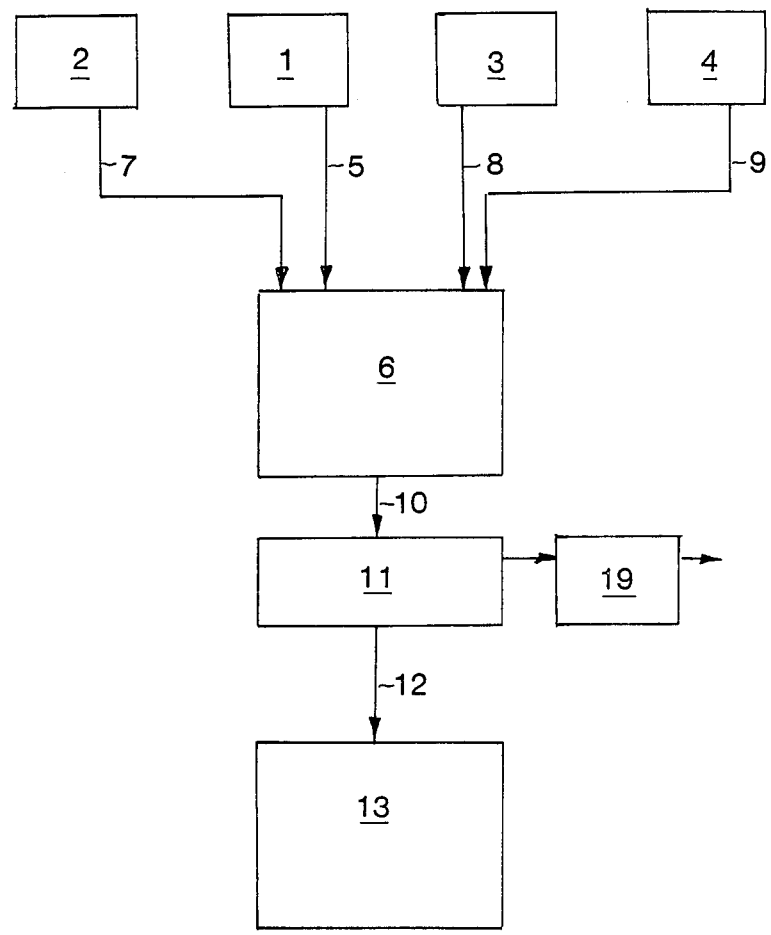

METHOD FOR RECOVERING USEFUL PRODUCTS FROM WASTE PRODUCTS OBTAINED WHEN MANUFACTURING ALUMINIUM FLUORIDE

DESCRIPTION

1. Technical Field

The present invention relates to a method for recovering useful products from waste products obtained when producing aluminium fluoride from aluminium hydroxide and fluosilicic acid; and more particularly to recovering sodium silicoaluminates and sodium fluoroaluminates from silica waste, mother liquor and wash-water deriving from the manufacture of aluminium fluoride.

An object of the present invention is to obtain a possibility of recovering useful and economically valuable products from the waste products obtained in the aluminium fluoride production.

2. Background of the Invention

When manufacturing aluminium fluoride, several troublesome waste products are obtained which must be deposited and, optionally, rendered harmless. Thus, there is obtained a silica waste which contains fluorine and aluminium impurities, and a mother liquor and a wash-water containing fluorine, aluminium and silicon. These waste products present a serious problem, since they occur in relatively large quantities and require complicated and expensive treatment before they can be deposited. It is true that silica residues per se can be deposited, but—as will be understood—the direct deposit of silica contaminated with large quantities of harmful impurities cannot be tolerated. The mother liquor and the wash water must be neutralized with calcium hydroxide to a pH-value of about 10, at which the fluorine and silicate contents thereof precipitate. This precipitate is then separated from the mother liquor and wash water, for example by centrifugation, and subsequently deposited.

Thus, the aforementioned waste products constitute a serious environmental problem, even though they may be treated in the manner indicated before being deposited. In addition, substantial amounts of silicon and fluorine are lost when the waste is treated in said manner.

The reactions involved in the production of aluminium fluoride are given below, the waste products being underlined.

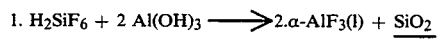

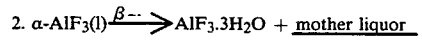

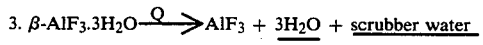

Prior art recognizes some different methods for recovering active silica and cryolite as well as other compounds from fluosilicic acid and waste products from the preparation of aluminium fluoride.

Austrain,B, 314 474 discloses the production of aluminium fluoride from fluosilicic acid recovered from the production of phosphate containing fertilizers. Hereby 8–25% fluosilicic acid is reacted with aluminium hydroxide in a relation which is 0.95–1.05:1 of the stoichiometric relationship according to the formula. $H_2SiF_6 + Al(OH)_3 \rightarrow 2AlF_3 + SiO_2 + H_2O$ at a temperature of 60°–100° C. The aluminium fluoride obtained can be used for the production of cryolite. Aluminium hydroxide is thereby reacted with fluosilicic acid in two steps, using one third of the amount of aluminium hydroxide requested in the first step, and two thirds thereof in the second step, whereby a mixture containing aluminium fluoride, which is precipitated and separated off, and aluminium hydrofluoric acid is obtained. The aluminium hydrofluoric acid is then treated with alkali at pH 3–6.5, preferably at pH 6–6.5 and at a temperature of 60° C. to form cryolite. This process, however, requires very pure components as otherwise contaminations of i.a. phosphates will precipitate and contaminate the cryolite. Any silica present will also form complexes which contaminates the cryolite and deteriorates the quality thereof.

Using fluosilicic acid and ammonia as starting materials active silica and cryolite can be prepared (Austrain, B, 315128). Thereby ammonium fluoride and silica are primarily prepared, whereafter the ammonium fluoride is reacted with sodium aluminate to the formation of cryolite.

Swedish,B, 366723 relates to a process to recover fluorine and aluminium from dilute, aqueous solutions, particularly mother liquors obtained in the crystallization of aluminium fluoride, whereby the mother liquors are treated with ammonia, or ammonium dicarbonate to give a chiolite-analogous ammonium compound, $(NH_4)_5Al_3F_{14}$. The precipitation of said compound is carried out at pH 6–6.5.

Swedish,B, 7502835-7 relates to a concentrated synthetic fluxing agent based on calcium fluoride, where remaining fluorine quantities from the production of aluminium fluoride from fluosilicic acid and aluminium hydroxide are precipitated using a calcium compound.

In accordance with Swedish,A, 8100218-0 a method for recovering useful products from waste of the described form is disclosed, whereby silica obtained in the manufacture of aluminium fluoride and contaminated with, inter alia, fluorine and aluminium, is dissolved in a strongly basic hydroxide; mixing the first solution obtained with a second solution obtained by dissolving aluminium hydroxide with a strongly basic hydroxide, and with waste mother liquor and optionally also washing water from the manufacture of aluminium fluoride in such proportions that the pH-value of the mixture lies between about 10 and 14, the silica content of the waste products supplied being precipitated as a silicoaluminate, which is separated off, preferably by filtration, for optional further treatment or for direct use, whereafter fluorine, if present from the waste products, is recovered from the filtrate by adding thereto an aluminium compound in an amount sufficient to precipitate substantially all the fluorine content contained in the filtrate as a fluoroaluminate, which is separated off, preferably by filtration, for further use, and whereafter the final filtrate is passed to a recipient or utilized, for example, as process water in other processes.

Carrying out said method a sodium aluminium silicate is obtained which is rather alkaline and will thereby require a high demand of alum in the preparation of a paper from a paper pulp using said silicate as a filler.

DISCLOSURE OF THE PRESENT INVENTION

The present invention relates to a surprisingly distinctive method for recovering valuable substances in the form of useful products from waste of the aforedescribed kind, while at the same time substantially eliminating the environmental problems created by the waste. The method according to the invention is of further economic interest, since, among other things, the waste need not be neutralized, meaning that no calcium hydroxide need to be used, which in turn means lower costs.

By the present method it has been shown possible to prepare an aluminium silicate which is less alkaline than that described above as well as it has been shown possible to precipitate a fluoroaluminate having a very high purity and a crystal size that can be varied depending on simple variations of the precipitation conditions.

The present method is thus characterized by adding alkali metal ions in the form of an alkali metal salt to collected mother liquors and washing water obtained in the manufacture of aluminium fluoride and being contaminated with aluminium, silica, and fluorine, and by adjusting the hydrogen ion concentration of said mother liquors and washing water to a pH of 2.0 to 3.0 by adding an alkali metal base while maintaining a temperature of said collected solutions of above about 50° C., isolating the alkali metal fluoroaluminate thereby precipitated by filtration, whereafter the filtrate comprising silica and minor amounts of aluminium and fluorine can be passed to a second step for the recovery of one or more of said compounds, or otherwise used.

Further characteristics of the invention are set forth in the accompanying claims.

The term alkali metal base above means any potassium, sodium, or lithium hydroxide, carbonate, hydrogen carbonate or sulphite, preferably sodium hydroxide and sodium carbonate.

Thus, the useful product produced is a fluoroaluminate, preferably a sodium fluoroaluminate as chiolite or cryolite. In a second stage the silica content of the waste products can be recovered in the form of a silicoaluminate, preferably sodium silicoaluminate. Such products as sodium fluoroaluminate (cryolite), and sodium silicoaluminate can be used directly, and are requested by the market. Sodium fluoroaluminate or cryolite is used to a large extent as a fluxing agent when producing aluminium electrolytically. Sodium silicoaluminate can be used as a pigment agent in the paper-making industry and in the rubber and paint industry.

Cryolite is thus used mainly as a fluxing agent in the aluminium industry, but is also known as a fluxing agent when preparing enamels, as a filler in polishing/grinding discs, as an intensifying pigment, as a grinding powder, or as an insecticide.

According to the invention, the useable products are preferably recovered from the waste in sequential steps in a coherent process, in which first fluorine and aluminium are recovered in the form of a fluoroaluminate, preferably sodium fluoroaluminate, and the silicon content in an optional subsequent step, is recovered in the form of a silicoaluminate, preferably sodium silicoaluminate.

When recovering the fluorine and aluminium contents of the waste products, particularly the mother liquors and washing water (scrubber water) from the aluminium fluoride production, for example in the form of sodium fluoroaluminate (cryolite), there are collected such mother liquors and/or washing water, the hydrogen ion concentration thereof is controlled to be about pH 1 whereupon the hydrogen ion concentration is adjusted by the addition of sodium hydroxide and/or sodium carbonate to pH 2.0–3.0, more preferably 2.0–2.5. The temperature of the solution is brought to or maintained at, if already hot, at least 50° C., preferably 60° to 80° C. The amount of sodium added while adjusting the pH is most often too small and further sodium ions are thus requested, and are thereby added in the form of a sodium salt preferably sodium sulfate and/or sodium chloride. The sodium salt is from a dispensing point of view preferably added in the form of an aqueous solution. The addition of $Na^+$-ions can be done either before or after the adjustment of the pH to 2.0–3.0. So added the sodium fluoroaluminate will precipitate and the precipitate is isolated preferably by way of filtration such as vacuum and/or pressure filtration.

Sometimes, in order to increase the yield the aluminium content in the precipitation step of cryolite is primarily held low, whereby a part of the fluorine content present is firstly coprecipitated as sodium fluorosilicate. In a later part of the reaction aluminium sulphate is then added whereby said silicate is dissolved and the fluorine set free is reacted with the aluminium to form cryolite.

Having thus isolated the sodium fluoroaluminate (cryolite) the silica content of the waste products of the above described reactions, i.e. mainly silica from reaction 1 but also silica present in the mother liquor and washing water, can be recovered e.g. in the form of sodium silicoaluminate. Thereby a sodium silicate solution is prepared by dissolving the silica from reaction 1 in sodium hydroxide as well as an aluminium sulfate solution is prepared. Said solutions are added to the filtrate obtained after isolation of the cryolite and pH is adjusted to 6 to 14, preferably 7 to 10, whereby the sodium silicoaluminate precipitates. The sodium silicoaluminate as precipitated is isolated by filtration e.g. vacuum and/or pressure filtration.

Under certain circumstances the fluorine content of the silica may be too high to be used directly in the preparation of sodium aluminium silicate as cryolite will precipitate together therewith. Thereby it is possible to remove the fluorine content from the silica by suspending the silica waste in sulphuric acid, heating the mixture, whereby fluorine and silicofluoride are driven off, isolated in a scrubber and passed on to the precipitation step of fluoroaluminate, and the silica is suspended in water for dissolving any aluminium sulphate present. The slurry thus obtained is then passed to a filtration step, where the solid, and now pure silica is separated off, washed and passed on to the dissolver for production of sodium silicate and the aluminium sulphate solution containing sulphuric acid is passed to the precipitation step of sodium aluminium silicate.

It is further possible to eliminate any coprecipitated phosphate in the cryolite, which coprecipitation may occur at higher pH levels in the range indicated, by slurrying the cryolite precipitated in acidic environment i.e. at pH 1–2.

An exemplary, preferred embodiment of the process will now be described in more detail with reference to the accompanying drawing, the single FIGURE of which is a flow sheet of said embodiment.

Mother liquors and washing water from the manufacture of aluminium fluoride are optionally but preferably collected in a buffer storage tank 1 in which the pH can be adjusted to pH ~1 and the Al:6F molar ratio is adjusted to 1–1.25:1, 50% NaOH solution is stored in a storage tank 2, and a solution of $Na_2SO_4$ is stored in storage tank 3. In a further tank 4 a solution of aluminium sulphate containing 8% $Al_2O_3$ is stored. The collected solution from buffer tank 1 having a temperature of preferably 50°–70° C. to keep the formation of $Na_2SiF_6$ low, is via conduit 5 added to a reaction vessel 6 provided with heating means and stirring means (not shown). Heating is provided by a steam jacket. Sodium hydroxide solution is slowly added via a conduit 7 and the addition is made and controlled by a pH-meter (not shown) regulating the pH of the solution added to pH 2.0–2.5 (2.25±0.25). To increase the sodium content of the reaction mixture sodium sulphate (or alternatively sodium chloride) solution is added from the tank 3 via conduit 8. When so adding and controlling the said additions a fine-particle solid precipitates, which solid consists of sodium fluoro aluminate. The addition of sodium is so made that substantially all fluorine present in the collected solution is eliminated.

In case the fluorine content is high and the aluminium content is low, aluminium is added to the reaction vessel 6 via a conduit 9 in the form of an aluminium sulphate solution containing about 8% $Al_2O_3$, at which concentration the solution can be stored without risk of solid aluminium sulphate crystallizing.

In case the collected solution has a hydrogen ion concentration differing from about pH 1 the pH can be adjusted by adding sulphuric acid or sodium hydroxide to said value. By adding Al in the form of aluminium sulphate the aluminium: 6 fluorine molar ratio can be controlled, whereby said ratio should be 1–1.25:1. Likewise, fluosilic acid can be added to control said ratio. The pH shall be about 1 as at higher pH fluorine seems to be present as complexes which do not dissolve but remain in solution after precipitation.

The solution containing the precipitated sodium fluoroaluminate is then transferred via a conduit 10 to a sedimentation tank and then to a vacuo filtering device 11, wherein the solid sodium fluoro aluminate is separated off, washed, dried at about 100° C. and calcinated at 500° to 700° C. and is removed to a sacking station 19 and storage for delivery to the market. The sodium fluoroaluminate, cryolite, having a low residual content of phosphorus and silica is an excellent fluxing agent in the manufacture of aluminium.

In order to keep the quality of the cryolite high thereby eliminate problems when used as a fluxing agent the residual contents of Si and P should be held very low. Cryolite of the present method meets these demands.

The filtrate obtained from the filtration apparatus can be transferred via a conduit 12 to a second reaction vessel 13 for the production of a sodium aluminium silicate.

EXAMPLE 1

A combined solution consisting of a mother liquor and washing water from a scrubber from the manufacture of aluminium fluoride comprising 15 g F/l, 3.6 g $SiO_2$/l, 4.4 g Al/l, ~50 mg $P_2O_5$/l and having a pH of ~1 was used. The Al:6F molar ratio is thereby 1.25:1.

If the Al:6F molar ratio is >1.25:1 further fluorine can be added in the form of fluosilicic acid.

To 25 liters of this combined solution Na+-ions in the form of a 35% sodium chloride solution (350 g NaCl in total) are added, whereupon 370 ml of 50% NaOH-solution was added slowly during 15 min to raise pH to 2.2. The Na+-ion excess should be 1–2 g per liter. The solution was pre-heated to 60° C. and so maintained. The reaction solution was continuously stirred. Sodium ions had thereby been added in at least an amount of three times the molar content of aluminium. When increasing the pH of the solution a precipitate consisting of natriumfluoroaluminate was obtained. The reaction time to complete the precipitation is 1 to 3 hr. The solution containing the precipitate being dispersed therein was transferred to a vacuum filtration apparatus, where the sodium fluoroaluminate was separated off, washed with water, dried at about 100° C., calcinated at 500° to 700° C. and packed.

Yield: Sodium fluoroaluminate: 650 g containing 55.6% F, 28.8% Na, 14.8% Al, and 0.4% $SiO_2$, and 0.03% $P_2O_5$.

EXAMPLE 2

A combined solution inance with that of Example 1 was treated in the same way as the solution was treated in Example 1 above with the following exception. When the reaction had went on for about 20 minutes 13.8 g of aluminium was added in the form of an aluminium sulphate solution, whereafter the reaction was continued for another 1.5 hr.

Residue $SiO_2$ in the sodium fluoroaluminate was thereby reduced to 0.07%. All other analytical data corresponded to those obtained in Example 1.

EXAMPLE 3

2 liters of a combined solution comprising 18.5 g F/l, 10 g $Sio_2$/l, 5.0 g Al/l, ~50 mg $P_2O_5$/l and having a pH of ~1 were used. The Al:6F molar ratio was thereby 1.15.

The solution was treated in accordance with Example 1, step 1, above using 28 g NaCl, and 30 ml of 50% NaOH-solution. The end pH was 2.3, the reaction temperature 60° C., and the reaction time 3 hr.

Yield of sodium fluoroaluminate 64 g containing: 30.8% Na, 52.1% F, 12.8% Al, and 0.58% $SiO_2$ and 0.04% $P_2O_5$ (100% cryolite).

The sodium fluoroaluminate prepared can be obtained in the form of cryolite alone, chiolite alone, or mixtures thereof, depending on the order in which the reactants are added together. Having the whole contents of sodium ions present from the beginning provides for a production of cryolite, whereby a late addition of sodium ions provides for a formation of chiolite. This will be evident from the following Examples 4 to 9.

EXAMPLE 4

4 l of a combined mother liquor and scrubber water solution of the composition given in Example 1 were added to a reaction vessel, whereupon 35 g NaCl were added and the total mixture was brought to a temperature of 60° C. Thereafter sodium carbonate was added to pH 2.5. The precipitate obtained consisted of sodium fluoroaluminate in the form of 100% cryolite.

EXAMPLE 5

4 l of a combined solution in accordance with Example 4 above and containing 35 g of NaCl were added simultaneously with a sodium carbonate aqueous solution (58.5 g of $Na_2CO_3$) to a reaction vessel. The temperature of the solutions was kept at 60° C. Final pH was 2.5. The precipitate obtained consisted of sodium fluoroaluminate in the form of 75% cryolite, and 25% chiolite.

EXAMPLE 6

4 l of a combined solution in accordance with Example 4 above were neutralized to pH 2.5 using sodium carbonate, whereupon 35 g of NaCl were added. The temperature of the solutions was 60° C. The precipitate obtained consisted of sodium fluoroaluminate in the form of 100% chiolite.

EXAMPLE 7

4 l of a combined solution in accordance with Example 4 above were heated to 60° C. and placed in a reaction vessel. To this solution 35 g of NaCl and sodium carbonate to pH 2.5 were added simultaneously. The precipitate obtained consisted of sodium fluoroaluminate in the form of 100% chiolite.

EXAMPLE 8

To a reaction vessel an aqueous solution of sodium chloride (35 g) was added, whereupon sodium carbonate and 4 l of a combined solution in accordance with Example 4 having an Al:6F molar ratio of 1.05:1 were added simultaneously. The precipitate obtained consisted of sodium fluoroaluminate in the form of 100% cryolite.

EXAMPLE 9

Cryolite was prepared in accordance with Example 1, whereafter, when still in the form of a slurry, sodium carbonate and $H_2SiF_6$ were added simultaneously to obtain an Al:6F molar ratio of 1.05 while maintaining pH of 2.5. Yield 100% of cryolite.

In case chiolite has been obtained the $NaF:AlF_6$ weight ratio can be corrected to fulfil the requirements set forth by the aluminium industry using cryolite as a fluxing agent whereby chiolite or chiolite/cryolite is granulated together with sodium carbonate to give a correct weight ratio, viz. 1.5.

Sodium fluoroaluminate can be prepared in a continuous process according to the present invention as well, whereby such a process will be exemplified below.

EXAMPLE 10

The combined solution identified (Ex 4) is stored in a buffer tank at 60° C. from where it is pumped to a first reaction vessel, from there to a second reaction vessel, from there to a third reaction vessel from which any precipitate formed is drawn off and allowed to settle in a fourth reaction vessel. The addition of the reactants can be made to the different reaction vessels in different orders depending on the final compound/product wanted.

The combined solution used in a series of tests of the continuous production contained as follows: F 12.0 g/l; Al 3.6 g/l; $SiO_2$ 2.57 g/l; Ca 210 mg/l; $P_2O_5$ 60 mg/l.

Al:6F molar ratio 1.26.

Sodium chloride solution: 200 g NaCl/l.

Technical grade of sodium carbonate.

| Test parameters | | | | | | | | |
|---|---|---|---|---|---|---|---|---|
| Test no | Addition of comb. solution ml/min | Addition of NaCl solution ml/min | Addition of NaCl to vessel no | Addition of NaCl to comb. solution g/l | Addition of $Na_2CO_3$ to vessel no | Reaction temp °C. | Cryolite % | Chiolite % |
| 1 | 170 | 16.7 | 1 | 20 | 1 | 50 | 93 | 7 |
| 2 | 170 | 16.4 | 2 | 20 | 1 | 50 | 40 | 60 |
| 3 | 173 | 16.3 | 1 | 20 | 1 | 60 | 93 | 7 |
| 4 | 173 | 33.2 | 1 | 40 | 1 | 50 | 100 | 0 |
| 5 | 170 | — | Buffer tank | 12 | 1,2,3 | 50 | 10 | 90 |
| 6 | 170 | 15 | 1 | 18.8 | 2 | 60 | 17 | 83 |

| Analyses of final products | | | | | | |
|---|---|---|---|---|---|---|
| Test no | $H_2O$ 350° C. | Na % | Al % | F % | $SiO_2$ % | $P_2O_5$ % |
| 1 | 3.11 | 31.1 | 12.6 | 52.4 | 0.69 | 0.12 |
| 2 | 2.57 | 28.9 | 13.3 | 54.2 | 0.79 | 0.11 |
| 3 | 1.95 | 30.5 | 12.3 | 53.2 | 0.21 | 0.15 |
| 4 | 2.24 | 30.7 | 12.5 | 52.8 | 0.46 | 0.12 |
| 5 | 3.00 | 26.5 | 14.5 | 53.5 | — | — |
| 6 | 3.06 | 26.7 | 14.4 | 53.2 | — | — |

| Analyses of filtrate | | | | | | |
|---|---|---|---|---|---|---|
| Test no | Na g/l | F g/l | Al g/l | $SiO_2$ g/l | $P_2O_5$ mg/l | pH |
| 1 | 6.3 | 1.4 | 1.0 | 2.4 | 33 | 2.45 |
| 2 | 5.8 | 1.4 | 0.95 | 2.3 | 33 | 2.48 |
| 3 | 5.6 | 1.8 | 1.1 | 2.5 | 36 | 2.46 |
| 4$^x$ | 12.1 | 0.12 | 0.05 | 3.4 | 25 | 2.50 |
| 5 | 5.0 | 1.6 | 0.6 | 2.3 | 35 | 2.43 |
| 6 | 4.8 | 1.7 | 0.58 | 2.3 | 38 | 2.11 |

$^x$Cryolite suspension adjusted with hexafluorosilicic acid to Al/6 F = 1.05 and sodium carbonate to pH 2, the contents prior to the adjustment being Na 12.1%; F 1.5%; Al 0.95; $SiO_2$ 2.2; pH 2.52.

I claim:

1. A method for recovering usable products derived from the manufacture of aluminum fluoride from $H_2SiF_6$ and $Al(OH)_3$ to form liquid —$AlF_3$, and thereafter treating said —$AlF_3$ to form insoluble, anhydrous $AlF_3$, said manufacture leaving mother liquors and washing waters containing aluminum, and fluorine in amounts below the solubility limit of anhydrous $AlF_3$ and containing contaminating silica, characterized by collecting the mother liquors and washing waters, and adding alkali metal ions in the form of an alkali metal salt, adjusting the hydrogen ion concentration of said collected solution to a pH of 2.0 to 3.0 by adding an alkali metal base while maintaining a temperature of said collected solution above about 50° C., and isolating the alkali fluoride aluminate thereby precipitated.

2. A method according to claim 1, characterized in that sodium hydroxide and a sodium salt, are used in forming a sodium fluoroaluminate.

3. A method according to claim 2, wherein the sodium salt is selected from the group consisting of sodium sulfate and sodium chloride.

4. A method according to claim 1, characterized in that the pH is 2.0-2.5.

5. A method according to claim 1, characterized in that the molar ratio of Al:6F in the collected solution is 1-1.25:1.

6. A method according to claim 1, characterized in that the aluminium content of the reaction mixture is adjusted after addition of the base and the alkali metal salt.

7. A method according to claim 6, characterized in that the aluminium content is increased after a first precipitation of fluoroaluminate, to precipitate further fluoroaluminate from fluorine set free at said increase.

8. A method according to claim 1, characterized in that pH of the collected solution is controlled to be about pH 1 prior to adjusting it to pH 2.0-3.0.

9. A method according to claim 1, characterized in that the temperature is held between 50° and 90° C.

10. A method according to claim 9, wherein the temperature is held between 60° to 80° C.

11. A method according to claim 1, which further comprises treating the resultant filtrate comprising mainly silica, and minor amounts of aluminium and fluorine to recover one or more of said compounds.

* * * * *